(12) United States Patent
Fujioka et al.

(10) Patent No.: US 7,044,722 B2
(45) Date of Patent: May 16, 2006

(54) SCROLL FLUID-MACHINE AND ASSEMBLING METHOD THEREOF (75) Inventors: Tamotsu Fujioka, Kanagawa-ken (JP); Ken Yanagisawa, Kanagawa-ken (JP)

(73) Assignee: Anest Iwata Corporation, Yokohama (JP)

( * ) Notice: Subject to any disclaimer, the term of this patent is extended or adjusted under 35 U.S.C. 154(b) by 292 days.

(21) Appl. No.: 10/330,671

(22) Filed: Dec. 30, 2002

(65) Prior Publication Data
US 2003/0223898 A1    Dec. 4, 2003

(30) Foreign Application Priority Data
Dec. 28, 2001 (JP) .............................. 2001-401211

(51) Int. Cl.
F04C 18/00 (2006.01)
F03C 2/00 (2006.01)

(52) U.S. Cl. ..................... 418/55.3; 418/55.1; 464/102

(58) Field of Classification Search ............... 418/55.3, 418/55.1; 464/102
See application file for complete search history.

(56) References Cited

U.S. PATENT DOCUMENTS 5,154,592 A * 10/1992 Ohtani et al. ............... 418/55.3
5,556,269 A * 9/1996 Suzuki et al. ............... 418/55.3

FOREIGN PATENT DOCUMENTS

| JP | 63050691 A | * | 3/1988 |
| JP | 06213174 A | * | 8/1994 |
| JP | 2562581 | | 9/1996 |

* cited by examiner

Primary Examiner—Theresa Trieu
(74) Attorney, Agent, or Firm—Crowell & Moring LLP (57) ABSTRACT The invention aims to provide a scroll fluid machine which has auxiliary cranks divided into two separate crank members connected by pressure fitting in the process of assembling of the scroll machine. Each of the auxiliary cranks for regulating the motion of the revolving scroll is divided into a revolving scroll side crank member and a stationary scroll side crank member, the crank members are configured such that one of the crank members can be pressed into the other crank member, and both of the crank members are connected to compose a one-piece auxiliary crank when both of the scrolls are assembled.

6 Claims, 9 Drawing Sheets

SCROLL FLUID-MACHINE AND ASSEMBLING METHOD THEREOF

BACKGROUND OF THE INVENTION

The present invention relates to a scroll fluid machine for compressing, expanding, or pressure feeding fluid and an assembling method thereof.

DESCRIPTION OF THE RELATED ART

In a scroll fluid machine, three sets of mechanism for preventing rotation of the revolving scroll comprising auxiliary crank are placed near the periphery of the scrolls at equal circumferential spacing in order to prevent rotation of the revolving scroll and allow it to revolve.

It is necessary that the mirror-surfaces of both of the revolving and stationary scrolls are parallel to each other, since if they are not parallel to each other, hermeticity of the closed compression pocket formed by the wraps of the scrolls as the revolving scroll revolves is damaged due to the deflection of the mirror-surfaces. Therefore, each scroll should be supported by means of the auxiliary cranks of the rotation preventing mechanisms so that both of the mirror-surfaces are parallel.

In Japanese Patent No. 2562581 is disclosed a scroll compressor which has three sets of mechanism for preventing rotation of the revolving scroll capable of adjusting the gap between the top surface of wrap and the mating mirror-surface by rotating the double nuts which determine the position of the auxiliary crank of each of the rotation preventing mechanisms relative to the bearing provided in the bearing housing of the stationary scroll.

Therefore, the gap between the top surface of wrap and the mating mirror surface is adjusted after the stationary scroll and revolving scroll are assembled, and the adjusting must be performed for three auxiliary cranks, which means the adjusting is intricate and time-consuming.

If each of the auxiliary cranks is divided into two parts, a stationary scroll side crank member and a revolving scroll side crank member, one of the crank members being able to be pressed into the other crank member to connect them to be compose a one-piece auxiliary crank, and both of the crank members installed respectively in the both of the scrolls are pressed into one-piece when both of the scrolls are assembled, said adjustment procedure of the gap after assembling both of the scrolls is eliminated. In this case, if both of the crank members are so configured that the distance between the mirror-surfaces of both of the scrolls can be adjusted by press-in depth of one of the crank member into the other crank member, dimensional deviation of component parts can be cancelled by the press-in depth.

When the dimensions of the component parts are accurate, the scrolls are assembled without undue deflection of the scroll plate by preparing a standard auxiliary crank having the length (this length mean the effective length which determine the position of the auxiliary crank in the scrolls in the direction of axis thereof) corresponding to the distance between the mirror-surfaces of both of the scrolls. But, when there is dimensional deviation of the component parts, the scroll plates may be deflected when both of the scrolls are assembled if said length of the standard auxiliary crank does not correspond to the distance between the mirror-surfaces at all of the rotation prevention mechanisms.

The dimensional deviation varies depending on production lots, so that many auxiliary cranks of different size (tolerance) must be prepared, resulting in complicated production control.

SUMMARY OF THE INVENTION

The present invention was made in light of the problem mentioned above, and an object of the invention is to provide an auxiliary crank composed of a pair of crank members capable of being connected by pressing-in one of the crank members to the other crank member to compose a one-piece auxiliary crank and a scroll fluid machine having said auxiliary crank.

Another object of the present invention is to provide a scroll fluid machine which does not need the adjustment of the distance between the mirror-surfaces after the revolving scroll and stationary scroll are assembled.

The present invention proposes a scroll fluid machine having a revolving scroll side connected to a stationary scroll side by means of auxiliary cranks for regulating the motion of the revolving scroll, wherein each of said auxiliary crank comprises a revolving scroll side crank member and a stationary scroll side crank member, and both of the crank members are connected by pressing one of the crank members into the other crank member to compose a one-piece auxiliary crank.

Figure 1:
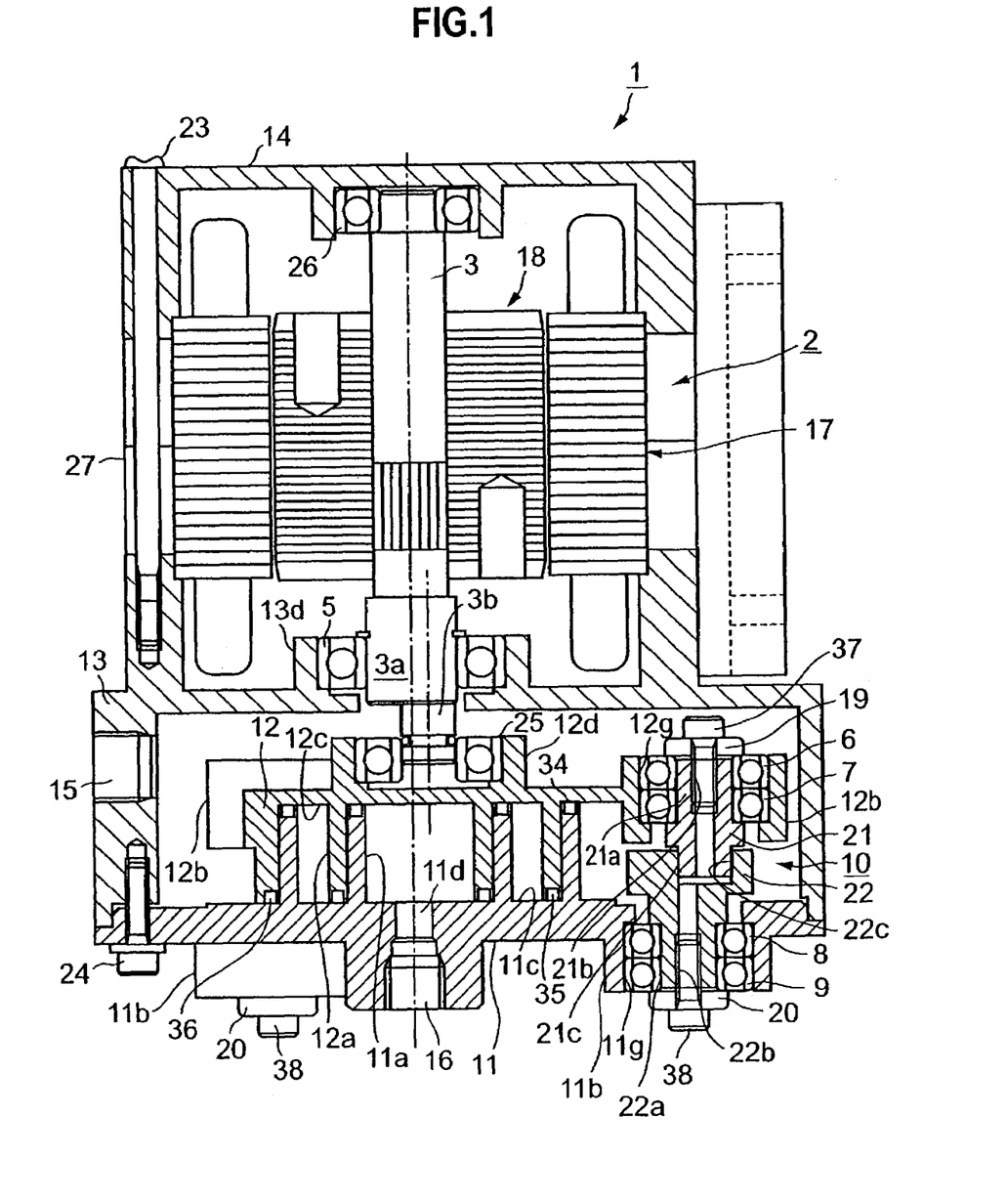
FIG. 1 is a sectional view of an embodiment of the scroll fluid machine of the present invention.

Here, "revolving scroll side" and "stationary scroll side" refer not only to the revolving scroll and stationary scroll respectively. Referring to FIG. 1, said revolving scroll side includes, for example, the scroll 12 having a revolving scroll wrap 12a and a mirror-surface 12c, and moving components attached to and revolving together with the revolving scroll 12.

Said stationary scroll side includes, for example, the stationary scroll 11 having a stationary scroll wrap 11a and a mirror-surface 11c, and the scroll housing 13 surrounding the revolving scroll 12 and fixed to the stationary scroll 11.

According to the present invention, the auxiliary crank is divided into two crank members of the revolving scroll side and stationary scroll side, and both of the crank members are connected to compose a one-piece crank by pressing one of the crank members into the other crank member.

Therefore, even if there is dimensional deviation of component parts, the length (this length mean the effective length which determine the position of the auxiliary crank in the scrolls in the direction of axis thereof, as mentioned before) of the auxiliary crank can be adjusted by adjusting the press-in depth of one of the crank members into the other crank member in accordance with the distance between the mirror-surfaces of both of the scrolls, that is, in accordance with the scroll wrap height.

To be more specific, when auxiliary cranks having different length are needed for maintaining the even distance between the mirror-surfaces of both of the scrolls at all of the three rotation preventing mechanisms, if the auxiliary cranks having the same length is used, deflection occurs in the scroll plates.

By adjusting the press-in depth of one of the crank members to connect both of the crank members, dimensional deviation of the component part can be absorbed or cancelled. Therefore, it is not necessary to prepare auxiliary cranks of different dimension (tolerance), and dimensional deviation of component parts can be circumvented by adjusting the press-in depth. When scrolls with another scroll wrap height is to be assembled, the auxiliary cranks having the length corresponding to the wrap height are needed. This is also achieved by adjusting press-in depth of one of the crank member into the other crank member to compose a one-piece auxiliary crank.

The auxiliary crank is divided into two crank members of the revolving scroll side and stationary scroll side, and both of the crank members are connected to compose a one-piece crank by pressing one of the crank members into the other crank member. In this way, auxiliary cranks each having the length capable of canceling dimensional deviation of component parts which differ depending on rotation preventing mechanisms and production lots are composed, resulting in a reduction of costs.

It is an effective means of the present invention that pairs of crank members are selected in accordance with scroll wrap height and one of each pair of crank members is pressed into the other crank member to compose an auxiliary crank corresponding to the wrap height.

With the technical means like this, by preparing one or both of the crank members of various length and selecting the crank members, an auxiliary crank having the length corresponding to scroll wrap height can be composed.

It is also an effective means of the present invention that both of the crank members are pressed into both side of a connector piece (spacer) to compose a one-piece auxiliary crank having the length corresponding with scroll wrap height.

With the technical art like this, the length of the auxiliary crank can be changed largely by changing the thickness of the spacer.

It is also an effective means of the present invention that press-in depth of at least one of the crank members into said connector piece (spacer) is varied to compose a one-piece auxiliary crank having the length corresponding with scroll wrap height.

With the technical art like this, it is not necessary to prepare a variety of pair of crank members. It is enough to prepare at least one of the crank members of various lengths and change said one of the crank members to correspond to scroll wrap height.

It is also an effective means of the present invention that a longitudinal slit or a longitudinal slit and a lateral slit are cut in said other crank member to ease the insertion of said one of the crank members into the hole of the other crank member and the one of the crank member is clasped firmly in said hole by a tightening bolt crossing the longitudinal slit to compose auxiliary crank having the length corresponding with scroll wrap height.

With the technical art like this, by preparing one of the crank members of various length and selecting the one which corresponds to the height of the scroll wrap, it becomes unnecessary to prepare many auxiliary cranks of various length and cost reduction is achieved.

The auxiliary crank according to the present invention is characterized in that it is composed of a pair of crank members capable of being connected by pressing in one of the pair of crank members, and a plurality of at least one of the crank members of different height are prepared so that said one of the crank members can be selected.

By preparing a plurality of one of the crank members of different length and selecting one of the crank members in order to correspond to the height of the scroll wrap, it is not necessary to prepare many auxiliary crank of different length, resulting in a reduction of costs.

Further, the method of assembling a scroll fluid machine is characterized in that each of the auxiliary cranks is divided in two crank members, each crank member is mounted on the revolving side and stationary scroll side respectively, and both of the scrolls are assembled by shifting one of the scroll side in the direction of the axis of the crank member so that one of the crank members is pressed into the other crank member to be connected to compose a one-piece auxiliary crank.

According to the invention, each of the auxiliary cranks is divided into a revolving scroll side crank member and a stationary scroll side crank member, and both of the crank members are connected in the assembling process of the scroll machine by shifting the revolving or stationary scroll side in the direction of the axis of the crank members. Thus a one-piece auxiliary crank is composed in the scroll machine when both of the scrolls are assembled. Therefore, it is not necessary to adjust the gap between the tip of the scroll wrap and mirror-surface after both of the scrolls are assembled. Said gap is already adjusted when both of the scrolls are assembled, as the press-in depth is adjusted in the process of assembling. In this way, a plurality (three) of auxiliary crank are composed in the scroll machine by pressing one of the crank members into the other crank member in the process of assembling the scroll machine.

Therefore, according to the present invention, as the auxiliary crank is divided into a revolving scroll side crank member and a stationary scroll side crank member and both of the crank members are connected by press fitting, dimensional deviation of components parts can be cancelled by the adjustment of the depth of insertion when assembling the revolving and stationary scroll side. As a result, preparation of auxiliary cranks of various dimension is not necessary, auxiliary cranks can be composed in assembling process in accordance with dimensional deviation of component parts which differs according to production lots, and cost reduction is achieved.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

FIG. 1 is a sectional view of an embodiment of the scroll fluid machine of the present invention. In the drawing, a scroll fluid machine 1 is composed of a revolving scroll 12 having a wrap 12a, a stationary scroll 11 having a wrap 11a meshing with said wrap 12a, a scroll housing 13 surrounding said revolving scroll 12 and fixed to said stationary scroll 11, and a motor housing 14 incorporating a motor 2 to drive said revolving scroll 12.

The circular stationary scroll 11 is provided with a discharge hole 11d in the center of the mirror-surface 11c thereof, the hole 11d communicating with a outlet port 16. The stationary scroll 11 have a stationary scroll wrap 11a extending spirally outwardly from the vicinity of said discharge hole 11d. A tip seal 34 made of fluorine contained resin having self-lubricating property is received in the groove defined in the tip of the wrap 11a.

Three bearing housing bosses of the stationary scroll 11b are formed equally spaced with a central angle of 120° near the periphery of the stationary scroll. Each bearing housing boss 11b has an opening 11g, in which ball bearings 8, 9 are received. The lower part 22a of a crank member 22 is fit in the inner races of the bearing 8 and 9 and a bolt 38 is screwed in the female screw 22b of the crank member 22 to fix the inner races thereto via a washer 20.

The revolving scroll 12 has a revolving scroll wrap 12a extending spirally to mesh with the stationary scroll wrap 11a. A tip seal 35 made of fluorine contained resin having self-lubricating property is received in the groove defined in the tip of the wrap 12a.

Three bearing housing bosses of the revolving scroll 12b are formed near the periphery of the revolving scroll corresponding to those of the stationary scroll. Each bearing housing bosses 12b has an opening 12g, in which ball bearings 6, 7 are received.

The upper part 21a of a crank member 21 is fit in the inner races of the bearing 6 and 7 and a bolt 37 is screwed in the female screw 21b of the crank member 21 to fix the inner races thereto via a washer 19.

The end part 21c of the crank member 21 of the revolving scroll 12 side is pressed into the hole 22c of the crank member 22 of the stationary scroll 11 side to form an auxiliary crank with the center axis of the crank member 22 and that of the crank member 21 offset to compose a rotation preventing mechanism 10.

The revolving scroll 12 has a wall surrounding the stationary scroll wrap 11a and a dust seal 36 is received in the groove defined in the tip of the wall, the tip surface facing the mirror-surface 11c of the stationary scroll.

A bearing housing boss of the revolving scroll 12d is formed on the other side of the mirror-surface 12c of the revolving scroll 12 in the housing hole of which is fitted a ball bearing 25.

The scroll housing 13 having a inlet port of fluid 15 is provided with a bearing housing boss of the motor housing 13d which is fitted a ball bearing 5. In side the scroll housing 13 and the motor housing 14 is mounted a rotation shaft 3 having a rotor 18, and a stator 17 surrounding the rotor 18 is attached to the motor housing 14 which is fixed to the scroll housing 13 by means of bolts 23. The stationary scroll 11 is fixed to the scroll housing 13 by means of bolts 24.

An end side of the rotation shaft 3 is supported for rotation by the motor housing 14 via a ball bearing 26 and the other end side 3a is supported for rotation by a ball bearing 5 received in the bore of the bearing housing boss 13d of the scroll housing 13.

An offset crank member part projecting from the end surface of said end side 3a of the rotation shaft 3 is fit in the inner race of the ball bearing 25.

In the scroll fluid machine 1 composed as described above, the revolving scroll 12 revolves as the rotation shaft 3 rotates, fluid is sucked from the inlet port 15 of the scroll housing 13 to be taken into the closed pocket formed by the wraps of the revolving and stationary scrolls. The closed pocket is transferred toward center reducing in its volume as the revolving scroll revolves and the fluid in the pocket is compressed to be discharged from the discharge hole 11d and then let out from the outlet port 16.

Next, the method of pressing the revolving scroll side crank member 21 into the stationary scroll side crank member 22 will be explained with reference to FIG. 2.

Figure 2:
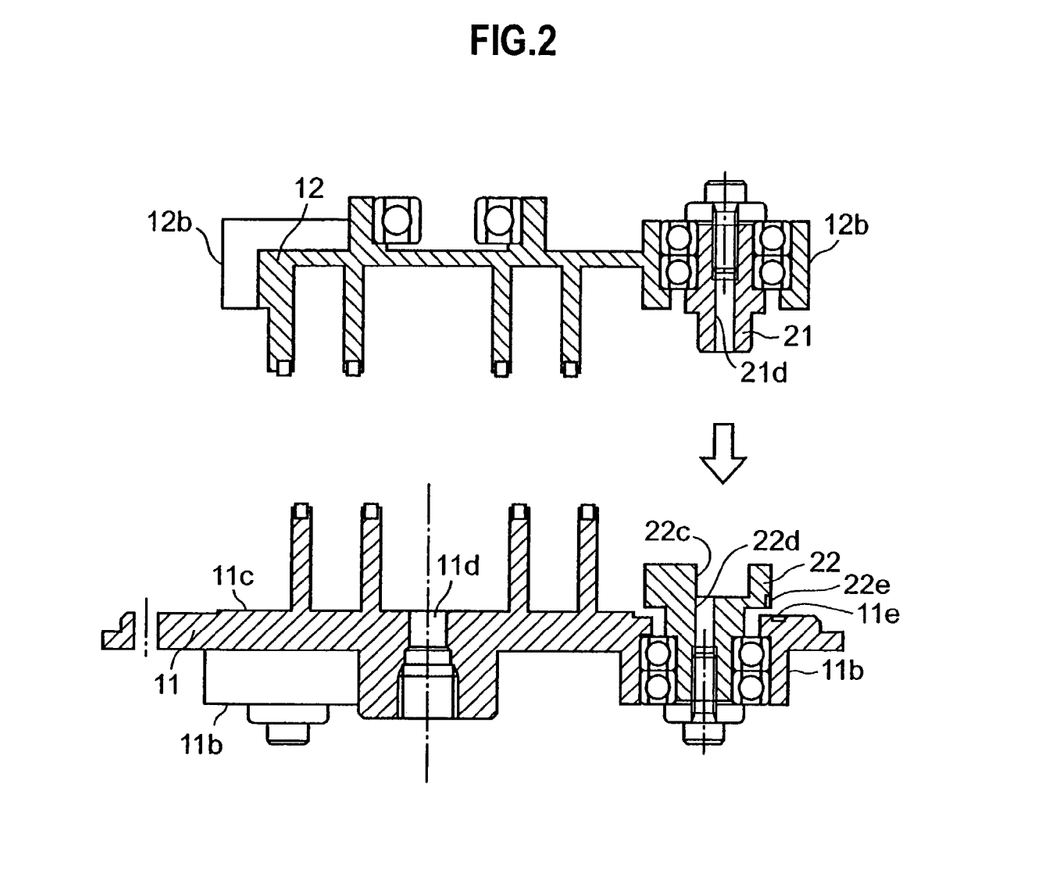
FIG. 2 is an illustration for explaining the method of assembling the revolving scroll side with stationary scroll side mounted with revolving scroll side crank members and stationary scroll side crank members respectively.

Referring to FIG. 2, three bearing housing bosses 12b are provided near the periphery of the revolving scroll 12 equally spaced with center angle of 120° as mentioned before. Similarly, the stationary scroll is provided with three bearing housing bosses 11b corresponding to the three bearing housing bosses 12b of the revolving scroll 12.

Marks 11e are inscribed on the stationary scroll to show the position of the openings of the bearing housing bosses 11b. One of the marks 11e is on the straight line passing the centers of the stationary scroll and the opening of one of the nearing housing bosses 11b, other two marks are on the lines parallel to said straight line passing the centers of the openings of the other bearing housing bosses 11b.

The stationary scroll side crank member 22 has on its top the hole 22c, the center axis of which is offset from the center axis of the lower part 22a. A mark 22e is inscribed on the stationary scroll side crank member 22 on the straight line extending from the center of the lower part 22a(see FIG. 1) passing the center of the hole 22c. The stationary scroll side crank members 22 are rotated so that the marks 22e coincide with the marks 11e respectively. In this state, the revolving scroll is positioned so that the end part 21c(see FIG. 1) of each crank member 21 matches to the opening 22c of the crank member 22, then the revolving scroll 11 is pressed down so that the lower end part of each crank member 21 is pressed into the opening 22c of each crank member 22.

The existence of the hole 21d in the crank member 22 favors the pressing-in of lower end part of the crank member 21 into the opening 22c of the crank member 22.

Figure 3:
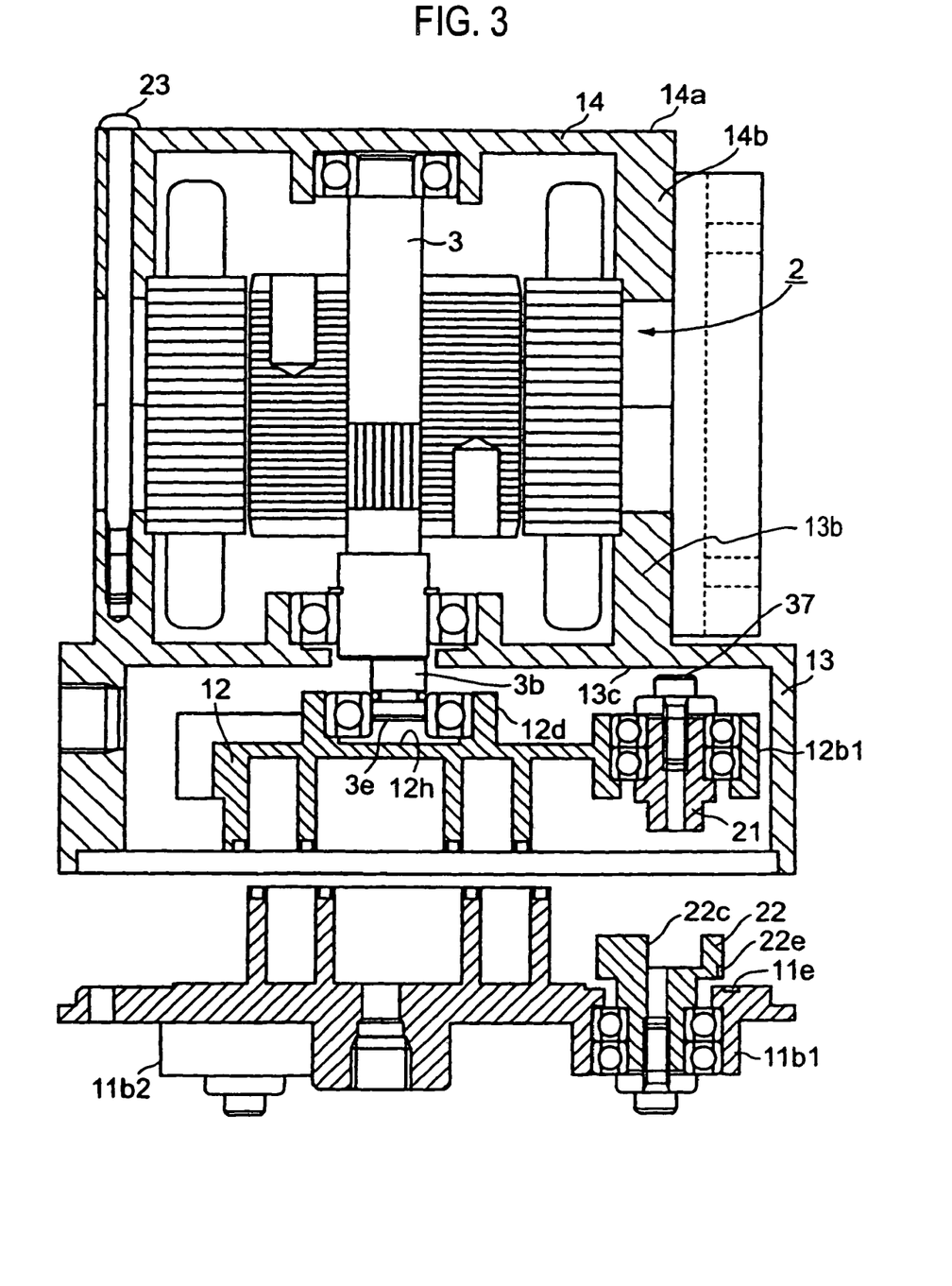
FIG. 3 is another illustration for explaining the method of assembling the revolving scroll side with stationary scroll side mounted with revolving scroll side crank members and stationary scroll side crank members respectively.

Next, the method of pressing the revolving scroll side crank member 21 into the stationary scroll side crank member 22 will be explained with reference to FIG. 3. The point of difference from FIG. 2 is that assembling is performed with the motor 2 accommodated in the motor housing 14 and scroll housing 13, and with the revolving scroll attached to the rotation shaft 3 of the motor.

In this case also each of the marks 22e are brought to coincide with each of the marks 11e respectively. Then the rotation shaft 3 is set to its maximum offset position toward right in the drawing.

The revolving scroll is positioned so that the lower end part 21c of each crank member 21 matches to the opening 22c of each crank member 22, then pressing force is applied on the motor housing 14 near the periphery so that the lower end part 21c of each crank member 21 is pressed into the opening 22c of each crank member 22. The pressing force applied on the motor housing is transmitted to the scroll housing 13, and the wall of the scroll housing deflects to contact the top of each bolt 37 which fixes the crank member 21 to the bearing 6, 7, and the revolving scroll side crank member 21 are pressed into the openings 22c of the stationary scroll side crank member 22.

The press-in depth of each of the crank members 21 into the hole 22c of each of the crank members 22 can be determined by the push-down distance of the motor housing 14. Since the distance between the mirror-surface of the revolving scroll and that of the stationary scroll can be adjusted by controlling said press-in depth, the adjusting is simple compared with the prior art of adjusting by means of the double nuts at three places, and accurate adjusting is possible.

It is preferable that the pressing force is applied on the top near the periphery 14a immediately above the circumferential wall 14b of the motor housing 14, and that the bolt 37 are located immediately below the circumferential wall 13b of the scroll housing 13 with a gap of about 0.5~1 mm between the top of the bolt 37 and the inner upper surface 13c of the scroll housing 13. Further, it is preferable that the clearance between the top face 3e of the rotation shaft 3 and the bottom surface 12h of the bearing housing 12d of the revolving scroll 12 is larger than the press-in depth of the crank member 21 into the opening 22c of the crank member 22.

As a result, the top face 3e of the rotation shaft 3 does not contact with said bottom surface 12h when pressing force is applied on the periphery part 14a of the motor housing 14. The pressing force is transmitted through the circumferential wall 14b of the motor housing 14 to the circumferential wall 13b of the scroll housing 13, then to the bolt 37 of the crank member 21, so that undue stress which induces damage of the motor does not act on the motor.

According to the embodiment, each of the auxiliary cranks is divided into a revolving scroll side crank member and a stationary scroll side crank member, and both of the scrolls can be assembled so that the mirror-surface of the revolving scroll is parallel to that of the stationary scroll without the necessity of adjusting the three auxiliary cranks by means of double nuts after the assembling of the scrolls by pressing the revolving scroll side crank member into the stationary side crank member with the press-in depth adjusted.

Another embodiment which is effective likewise will be explained hereunder.

Figure 4:
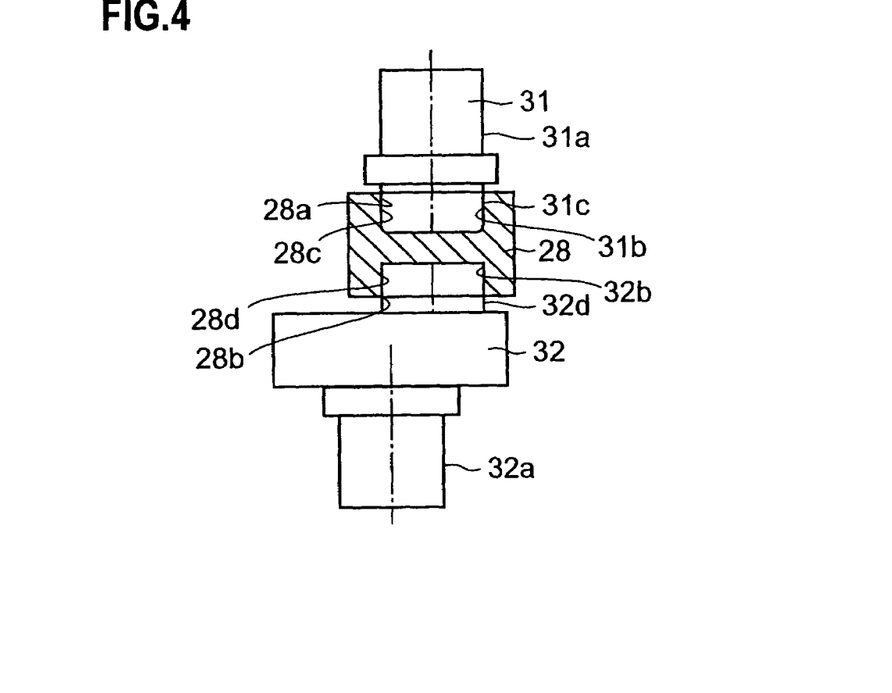
FIG. 4 is a side view of an embodiment of the auxiliary crank consisting of three component parts to be connected to compose an auxiliary crank including a partially sectional view.

FIG. 4 is a side view of an embodiment of the auxiliary crank consisting of three component parts to be connected to compose an auxiliary crank including a partially sectional view. A revolving scroll side crank member 31 and a stationary scroll side crank member 32 are pressed into a connecting ring 28 to be assembled into an auxiliary crank. The shaft part 31a of the crank member 31 is inserted into the bearings of the revolving scroll and the shaft part 32a of the crank member 32 is inserted into the bearing of the stationary scroll. The shaft part 31c of the crank member 31 is pressed into the opening 28c of the connecting ring 28 and the shaft part 32d of the crank member 32 is pressed into the opening 28d of the connecting ring 28 when both of the scrolls are assembled.

The length of the auxiliary crank cab be adjusted by preparing the connecting rings 28 of various height.

The opening 28c and 28d may be communicated to form a through hole and the press-in depth of the crank member 31, 32 can be adjusted to adjust the length of the auxiliary crank.

A female screw thread may be provided in the center of each of the shaft part 31a and shaft part 32a for fastening bearings by means of a bolt.

The edge 28a and 28b of the opening 28c and 28d respectively of the connecting ring 28 are preferable to be rounded or taper-chamfered. The edge 31b and 32d of the shaft part 31c and 32d of the crank member 31 and 32 respectively are preferable to be tapered or rounded. By tapering or rounding like this, the crank members can be easily pressed-in even when the center axis of the shaft part to be pressed-in does not coincide accurately with that of the opening for receiving the shaft part.

Figure 5:
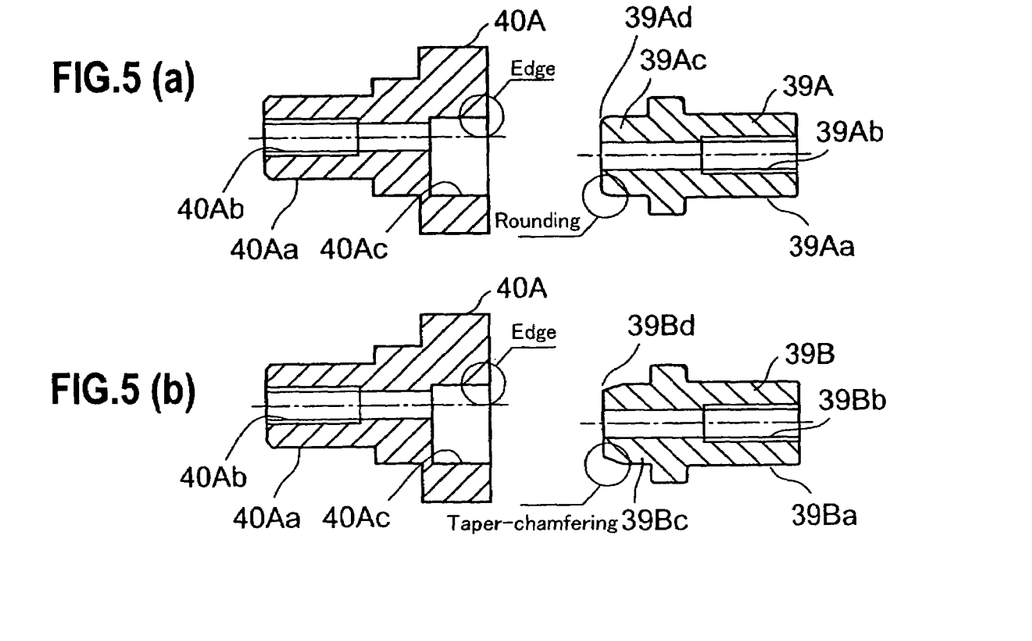
FIG. 5 shows sectional views of two embodiments of the auxiliary crank consisting of a pair of crank members to be connected to compose an auxiliary crank.

FIG. 5 shows sectional views of two embodiments of the auxiliary crank consisting of a pair of crank members to be connected to compose an auxiliary crank. FIG. 5(a) shows the case the top edge 39Ad of the shaft part 39Ac to be pressed-in of the revolving scroll side crank member 39A is rounded so that the shaft part 39Ac can be easily pressed into the opening 40Ac of the stationary scroll side crank member 40A. The shaft part 39Aa of the crank member 39A is inserted into the bearings of the revolving scroll, and the shaft part 40Aa of the crank member 40A is inserted into the bearings of the stationary scroll. Female screw thread 39Ab and 40Ab is cut in the center of the shaft part 39Aa and 40Aa respectively for fastening the bearings by means of a bolt.

FIG. 5(b) shows the case the top edge 39Bd of the shaft part 39Bc to be pressed-in of the revolving scroll side crank member 39B is taper-chamfered instead of being rounded as is the case with FIG. 5(a).

By tapering or rounding the top edge of the shaft part of the revolving scroll side crank member like this, the crank member can be easily pressed into the opening 40Ac of the stationary scroll side crank member even when the center axis of the shaft part 39Bc does not coincide accurately with that of the opening 40Ac.

Figure 6:
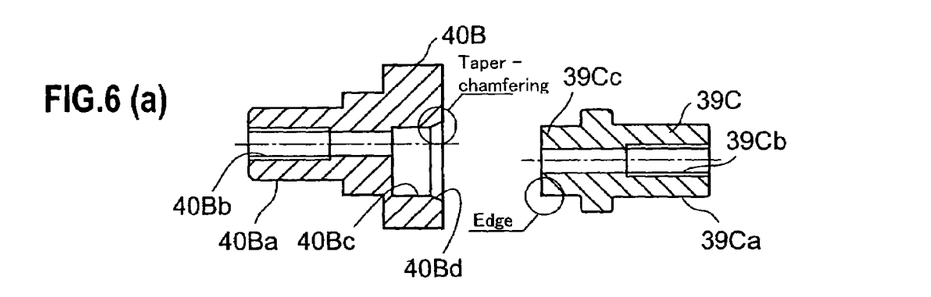
FIG. 6 shows sectional views of another three embodiments of the auxiliary crank consisting of a pair of crank members to be connected to compose an auxiliary crank.

FIG. 6 shows sectional views of another three embodiments of the auxiliary crank consisting of a pair of crank members to be connected to compose an auxiliary crank. In all of FIG. 6(a), (b), (c), the edge of the opening 40Bc of the stationary scroll side crank member 40B is chamfered in a tapered shape (40Bd), and the configuration of the crank member 40B is the same as that of the crank member 40A of FIG. 5 in other than that point.

Concerning the revolving scroll side crank member, the top edge of the shaft part 39Cc to be pressed-in is not rounded or taper-chamfered in the case of FIG. 6(a), but as the edge of the opening 40Bc of the crank member 40B is taper-chamfered, the shaft part 39Cc can be pressed into the opening 40Bc with relative ease. The configuration of the crank member 39 C is the same as that of the crank member 39A of FIG. 5.

In the case of FIG. 6(b), the crank member 39B is used and the top edge 39Bd of the shaft part 39Bc to be pressed-in is taper-chamfered, so the shaft part 39Bc can be easily pressed into the opening 40Bc.

In the case of FIG. 6(c), the crank member 39B is used and the top edge 39Ad of the shaft part 39Ac to be pressed-in is rounded, so the shaft part 39Ac can be easily pressed into the opening 40Bc.

Figure 7:
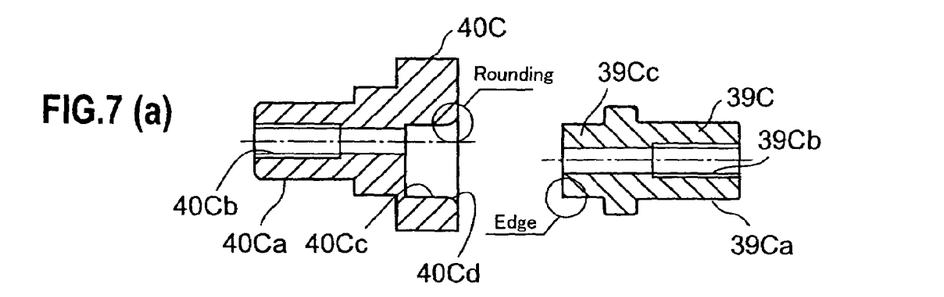
FIG. 7 shows sectional views of still another three embodiments of the auxiliary crank consisting of a pair of crank members to be connected to compose an auxiliary crank.

FIG. 7 shows sectional views of still another three embodiments of the auxiliary crank consisting of a pair of crank members to be connected to compose an auxiliary crank. In all of FIG. 7(a), (b), (c), the edge of the opening 40Cc of the stationary scroll side crank member 40C is rounded (40Cd), and the configuration of the crank member 40C is the same as that of the crank member 40A of FIG. 5 in other than that point.

Concerning the revolving scroll side crank member, the crank member 39C of FIG. 6 is used as revolving scroll side crank member and top edge of the shaft part 39Cc to be pressed-in is not rounded or tapered in the case of FIG. 7(a), but as the edge of the opening 40Bc of the crank member 40B is rounded (40Cd), the shaft part 39Cc can be easily pressed into the opening 40Bc.

In the case of FIG. 7(b), the crank member 39B is used and the top edge 39Bd of the shaft part 39Bc to be pressed-in is taper-chamfered, so the shaft part 39Bc can be easily pressed into the opening 40Cc.

In the case of FIG. 7(c), the crank member 39A is used and the top edge 39Ad of the shaft part 39Ac to be pressed-in is rounded, so the shaft part 39Ac can be easily pressed into the opening 40Cc.

By taper-chamfering or rounding the top edge of the shaft part to be pressed-in or the edge of the opening to receive the shaft part as shown in FIGS. 5,6, and 7, the shaft part to be pressed-in can be easily pressed into the opening to receive the shaft part even if the center axis of the shaft part does not coincide accurately with that of the opening.

Figure 8:
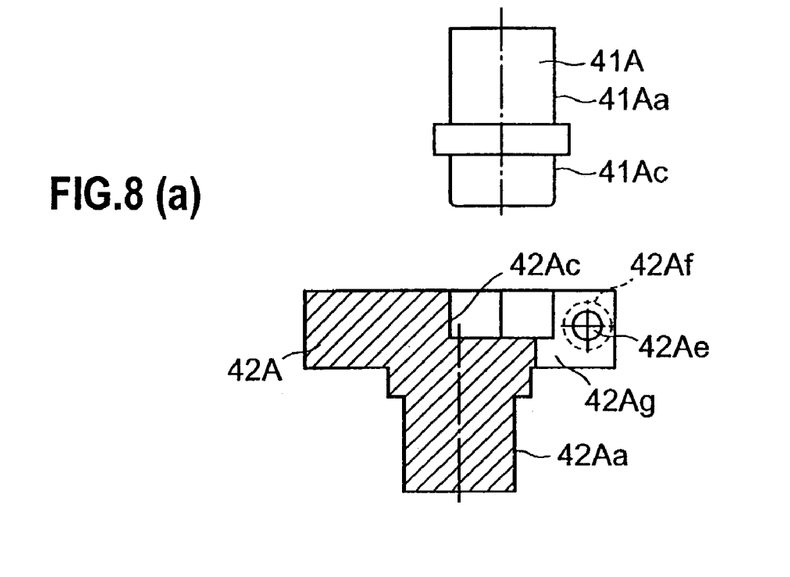
FIG. 8 shows an embodiment of the auxiliary crank consisting of a pair of crank members provided with a tightening bolt.

FIG. 8 shows an embodiment of the auxiliary crank consisting of a pair of crank members provided with a tightening bolt. FIG. 8(a) shows one of the crank member in a side view and the other crank member in a sectional view. FIG. 8(b) is a top plan view of the other crank member and FIG. 8(c) is a bottom plan view of the other crank member.

The stationary scroll side crank member having the shaft part 42Aa to be inserted into the bearings of the stationary scroll is formed into a mushroom-like shape having a cap and a stem, a hole 42Ac is formed in the cap, the center axis of the hole being offset from that of the stem. A slit 42Ag is cut in the cap along the center line passing the centers of the stem 42Aa and hole 42Ac. A screw hole 42Ae with spot facing 42Af is provided perpendicular to the slit 42Ag in order to firmly clasp the shaft part 41Ac of the revolving scroll side crank member 41A by tightening the bolt 33 after it is inserted into the hole 42Ac.

Figure 9:
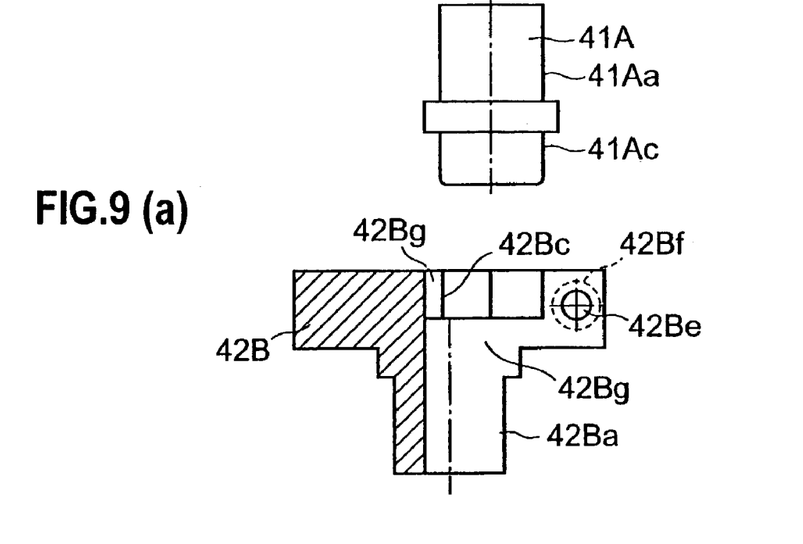
FIG. 9 shows another embodiment of the auxiliary crank consisting of a pair of crank members provided with a tightening bolt.

FIG. 9 shows another embodiment of the auxiliary crank consisting of a pair of crank members provided with a tightening bolt. FIG. 9(a) shows one of the crank member in a side view and the other crank member in a sectional view. FIG. 9(b) is a top plan view of the other crank member and FIG. 9(c) is a bottom plan view of the other crank member.

The point different from FIG. 8 is that a slit 42Bg is cut beyond the center axis of the shaft part 42Ba through the cap and the stem (shaft part 42Ba), although in the case of FIG. 8 the slit 42Ag is cut only in the cap.

Therefore, when the material and geometry are the same as those of FIG. 8, weaker tightening of the bolt 33 than the case of FIG. 9 is allowed for firmly clasping the shaft part 41Ac of the revolving scroll side crank member 41A after it is inserted into the hole 42Ac.

Figure 10:
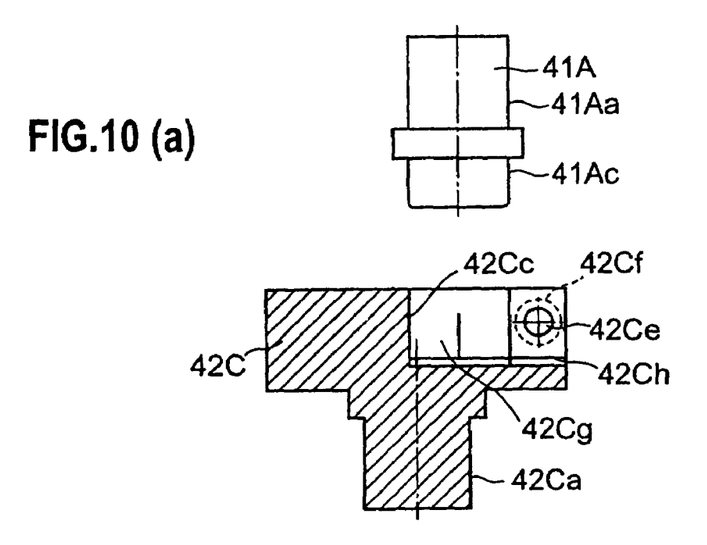
FIG. 10 shows still another embodiment of the auxiliary crank consisting of a pair of crank members provided with a tightening bolt.

FIG. 10 shows still another embodiment of the auxiliary crank consisting of a pair of crank members provided with a tightening bolt. FIG. 10(a) shows one of the crank member in a side view and the other crank member in a sectional view. FIG. 10(b) is a top plan view of the other crank member and FIG. 10(c) is a bottom plan view of the other crank member.

In this case, a lateral slit 42Ch reaching near the center axis of the stem (shaft part 42Ca) is cut in the cap of the crank member 42C in addition to a longitudinal slit 42Cg.

Therefore, when the material and geometry are the same as those of FIG. 8 and FIG. 9, still weaker tightening of the bolt 33 than the case of FIG. 8 and FIG. 9 is allowed for firmly clasping the shaft part 41Ac of the revolving scroll side crank member 41A after it is inserted into the hole 42Ac.

It is allowable that the revolving scroll side crank member is pressed into the hole of the stationary scroll side crank member with the bolt 33 tightened beforehand.

A female screw thread may be provided in both of the crank members in the center of the shaft part to be inserted into the bearings for fastening the bearings by means of a bolt.

It is possible in the embodiments of FIGS. 4~10 that a spacer (connector piece) is provided between both of the crank members which are pressed into both side of the spacer and the length of the auxiliary crank can be adjusted in accordance with the distance between the mirror-surfaces of both of the scrolls.

It is also suitable to apply an adhesive agent at least to the shaft part to be pressed-in or to the hole to receive the shaft part in order to reinforce the connection between the crank members.

Although the bearing housings bosses 12b are formed integral with the revolving scroll 12 as shown in FIG. 1, it is possible to prepare the bearing housing bosses separately and attach to the revolving scroll, for example, by means of bolts. In this specification, "revolving scroll side crank member" includes the crank member in both of the above cases.

Further, although the bearing housing bosses 11b are formed integral with the stationary scroll as shown in FIG. 1, it is possible to form the bearing housing bosses in the scroll housing 13 which surrounds the revolving scroll and is fixed to the stationary scroll. In this specification, "stationary scroll side crank member" includes the crank member in both of the above cases.

The invention claimed is:

1. A scroll fluid machine having a revolving scroll side connected to a stationary scroll side by auxiliary cranks for regulating the motion of the revolving scroll,
   wherein each of said auxiliary crank is divided into two crank members, a revolving scroll side crank member and a stationary scroll side crank member, and both of the crank members are connected by press-inserting one of the crank members into the other crank member to compose a one-piece auxiliary crank, and
   wherein a plurality of divided crank members are prepared, one side members or both side members of said divided crank members having different length, and a crank member is selected from among the plurality of one side crank members having different length in accordance with scroll wrap height and press-inserted into one of the other side crank members to compose a one-piece auxiliary crank having the length corresponding with the wrap height.

2. A scroll fluid machine having a revolving scroll side connected to a stationary scroll side by auxiliary cranks for regulating the motion of the revolving scroll, wherein each of said auxiliary crank is divided into two crank members, a revolving scroll side crank member and a stationary scroll side crank member, and both of the crank members are connected by press-inserting one of the crank members into the other crank member to compose a one-piece auxiliary crank, and wherein both of the crank members are pressed into both side of a connecting ring to compose a one-piece auxiliary crank having the length corresponding with scroll wrap height.

3. The scroll fluid machine according to claim 2, wherein press-in depth of at least one of the crank members into said connecting ring is varied to compose a one-piece auxiliary crank having the length corresponding with scroll wrap height.

4. A scroll fluid machine having a revolving scroll side connected to a stationary scroll side by auxiliary cranks for regulating the motion of the revolving scroll, wherein each of said auxiliary crank is divided into two crank members, a revolving scroll side crank member and a stationary scroll side crank member, and both of the crank members are connected by press-inserting one of the crank members into the other crank member to compose a one-piece auxiliary crank, and wherein a longitudinal slit, or a longitudinal slit, and a lateral slit, are cut in said other crank member to ease the insertion of said one of the crank members into the hole of the other crank member and the one of the crank member is clasped firmly in said hole by a tightening bolt crossing the longitudinal slit to compose an auxiliary crank having the length corresponding with scroll wrap height.

5. A scroll fluid machine having a revolving scroll side connected to a stationary scroll side by auxiliary cranks for regulating the motion of the revolving scroll, wherein each of said auxiliary crank is divided into two crank members, a revolving scroll side crank member and a stationary scroll side crank member, and both of the crank members are connected by press-inserting one of the crank members into the other crank member to compose a one-piece auxiliary crank, and wherein a plurality of divided crank members are prepared, one side members or both side members of said divided crank members having different length, and each of the plurality of the crank members of each side is press-inserted into a common insertion connecting member to compose a one-piece auxiliary crank.

6. A method of assembling a scroll fluid machine having a revolving scroll side connected to a stationary scroll side by auxiliary cranks for regulating the motion of the revolving scroll, wherein the auxiliary crank is divided in two crank members, each of the crank members being provided with an insertion connection portion to connect both the crank members by press-insertion, each of the crank members is mounted on the revolving scroll and stationary scroll side respectively, and both of the scrolls are assembled by shifting one of the scroll in the direction of the axis of the crank member so that one of said crank members is pressed into the other crank member to be connected at the insertion connection portions to compose a one-piece auxiliary crank.

* * * * *